US012793299B2

(12) United States Patent
Lu

(10) Patent No.: US 12,793,299 B2
(45) Date of Patent: Nov. 10, 2026

(54) IMAGE PROCESSING METHOD, AND DEVICE

(71) Applicant: Beijing Zitiao Network Technology Co., Ltd., Beijing (CN)

(72) Inventor: Zhixiong Lu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 114 days.

(21) Appl. No.: 18/879,938

(22) PCT Filed: Aug. 4, 2023

(86) PCT No.: PCT/CN2023/111174
§ 371 (c)(1),
(2) Date: Dec. 30, 2024

(87) PCT Pub. No.: WO2024/027819
PCT Pub. Date: Feb. 8, 2024

(65) Prior Publication Data

US 2026/0011058 A1 Jan. 8, 2026

(30) Foreign Application Priority Data

Aug. 5, 2022 (CN) ......................... 202210940358.7

(51) Int. Cl.
*G06T 11/00* (2026.01)
*G06T 5/50* (2006.01)
(Continued)

(52) U.S. Cl.
CPC ................ *G06T 11/60* (2013.01); *G06T 5/50* (2013.01); *G06T 5/60* (2024.01);
(Continued)

(58) Field of Classification Search
None
See application file for complete search history.

(56) References Cited

U.S. PATENT DOCUMENTS 12,277,747 B2 * 4/2025 Li ............................. G06T 7/50
2020/0125833 A1 * 4/2020 Qian .................... G06V 40/165
(Continued)

FOREIGN PATENT DOCUMENTS

CN 108573527 A 9/2018
CN 111768496 A 10/2020
(Continued)

OTHER PUBLICATIONS

China National Intellectual Property Administration, Search Report Issued in Application No. 2022109403587, Aug. 5, 2022, 1 page.
(Continued)

*Primary Examiner* — Martin Mushambo
(74) *Attorney, Agent, or Firm* — Alleman Hall LLP

(57) ABSTRACT

Embodiments of the present disclosure provide an image processing method and apparatus, a device, and a storage medium. The method includes: obtaining a first face image and a second face image; sending the first face image and the second face image to a server for fusion processing; displaying a second image as a background in a current picture; receiving at least one fused face image returned by the server; and overlaying, according to a set order, the at least one fused face image to a face region of the second image for displaying, and displaying a set object as a foreground in the current picture, wherein the set object is a target object corresponding to the first face image or a target object acquired in real time, and the target object acquired in real time corresponds to the target object corresponding to a first image.

20 Claims, 5 Drawing Sheets

(51) Int. Cl.
*G06T 5/60* (2024.01)
*G06T 11/60* (2006.01)

(52) U.S. Cl.
CPC ............... *G06T 2207/20084* (2013.01); *G06T 2207/20221* (2013.01); *G06T 2207/30201* (2013.01)

(56) References Cited

U.S. PATENT DOCUMENTS

| | | | | |
|---|---|---|---|---|
| 2021/0142440 | A1* | 5/2021 | Ahn ..................... | G06V 40/171 |
| 2021/0365673 | A1 | 11/2021 | Stockton et al. | |
| 2022/0392205 | A1* | 12/2022 | Sun ...................... | G06N 3/0464 |

FOREIGN PATENT DOCUMENTS

| | | | |
|---|---|---|---|
| CN | 112423022 | A | 2/2021 |
| CN | 112634469 | A | 4/2021 |
| CN | 114049459 | A | 2/2022 |
| CN | 114170342 | A | 3/2022 |
| CN | 114359471 | A | 4/2022 |
| CN | 114531553 | A | 5/2022 |
| CN | 115272151 | A | 11/2022 |
| WO | 2019024751 | A1 | 2/2019 |

OTHER PUBLICATIONS

ISA China National Intellectual Property Administration, International Search Report Issued in Application No. PCT/CN2023/111174, Oct. 1, 2023, 6 pages.

* cited by examiner

IMAGE PROCESSING METHOD, AND DEVICE

CROSS-REFERENCE TO RELATED APPLICATION(S)

This application is a U.S. National Stage Application of PCT Application Serial No. PCT/CN2023/111174, filed on Aug. 4, 2023, which claims priority to Chinese Patent Application No. 202210940358.7, filed with the China National Intellectual Property Administration on Aug. 5, 2022, the disclosures of which are incorporated herein by reference in their entirety.

FIELD

Embodiments of the present disclosure relate to the technical field of image processing, and for example, to an image processing method and apparatus, a device, and a storage medium.

BACKGROUND

At present, mobile terminals have become an indispensable tool for users to engage in entertainment activities. The users can use the mobile terminals for various kinds of image processing, among which, face image fusion is a common playing method. The playing method for face fusion in the related technology is relatively simple, and image content is monotonous and insufficient.

SUMMARY

Embodiments of the present disclosure provide an image processing method and apparatus, a device, and a storage medium.

In a first aspect, the embodiments of the present disclosure provide an image processing method, including:

- obtaining a first face image and a second face image, wherein the first face image is an image corresponding to a face region in a first image, and the second face image is an image corresponding to a face region in a second image;
- sending the first face image and the second face image to a server for fusion processing;
- displaying the second image as a background in a current picture;
- receiving at least one fused face image returned by the server; and
- overlaying, according to a set order, the at least one fused face image to the face region of the second image for displaying, and displaying a set object as a foreground in the current picture, wherein the set object is a target object corresponding to the first face image or a target object acquired in real time, and the target object acquired in real time corresponds to the target object corresponding to the first image.

In a second aspect, the embodiments of the present disclosure further provide an image processing method, including:

- receiving a first face image and a second face image sent by a client;
- outputting a first face-fused image by inputting the first face image and the second face image to an image fusion model; and

- outputting a second face-fused image by inputting the first face-fused image to an expression transformation model.

In a third aspect, the embodiments of the present disclosure further provide an image processing apparatus, including:

- an obtaining module, configured to obtain a first face image and a second face image, wherein the first face image is an image corresponding to a face region in a first image, and the second face image is an image corresponding to a face region in a second image;
- a processing module, configured to send the first face image and the second face image to a server for fusion processing;
- a first display module, configured to display the second image as a background in a current picture;
- a first receiving module, configured to receive at least one fused face image returned by the server; and
- a second display module, configured to: overlay, according to a set order, the at least one fused face image to the face region of the second image for displaying, and display a set object as a foreground in the current picture, wherein the set object is a target object corresponding to the first face image or a target object acquired in real time, and the target object acquired in real time corresponds to the target object corresponding to the first image.

In a fourth aspect, the embodiments of the present disclosure further provide an image processing apparatus, including:

- a second receiving module, configured to receive a first face image and a second face image which are sent by a client;
- a first output module, configured to output a first face-fused image by inputting the first face image and the second face image to an image fusion model; and
- a second output module, configured to output a second face-fused image by inputting the first face-fused image to an expression transformation model.

In a fifth aspect, the embodiments of the present disclosure further provide an electronic device. The electronic device includes:

- at least one processor; and
- a storage apparatus, configured to storage at least one program,
- wherein the at least one program, when executed by the at least one processor, causes the at least one processor to implement the image processing method described in any embodiment of the present disclosure.

In a sixth aspect, the embodiments of the present disclosure further provide a storage medium including computer-executable instructions. The computer-executable instructions, when executed by a computer processor, are used for performing the image processing method described in any embodiment of the present disclosure.

BRIEF DESCRIPTION OF THE DRAWINGS

Throughout the accompanying drawings, identical or similar reference numerals represent identical or similar elements. It should be understood that the accompanying drawings are illustrative, and components and elements may not necessarily be drawn to scale.

DETAILED DESCRIPTION OF EMBODIMENTS

Figure 1:
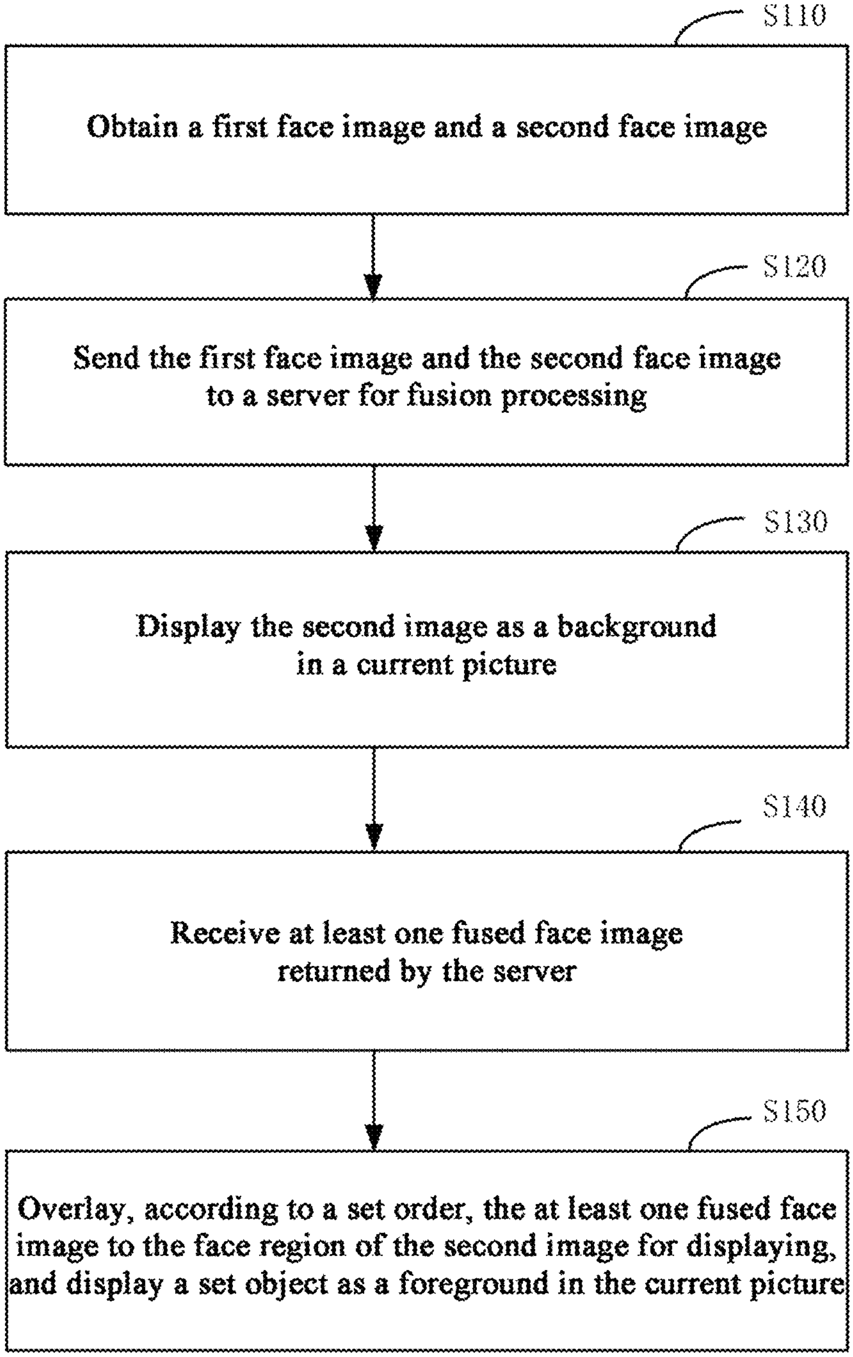
FIG. 1 is a flowchart of an image processing method according to an embodiment of the present disclosure.

The embodiments of the present disclosure will be described in detail below with reference to the accompanying drawings.

It should be understood that respective steps recorded in method implementations of the present disclosure can be executed in different orders and/or in parallel. In addition, the method implementations may include additional steps and/or omit the execution of the steps shown. The scope of the present disclosure is not limited in this aspect.

The term "include" and its variants as used herein mean open inclusion, namely, "including but not limited to". The term "based on" is "based at least in part on". The term "one embodiment" means "at least one embodiment". The term "another embodiment" means "at least another embodiment". The term "some embodiments" means "at least some embodiments". Relevant definitions of other terms will be given in the description below.

It should be noted that the concepts such as "first" and "second" mentioned in the present disclosure are only used to distinguish different apparatuses, modules, or units, and are not intended to limit the order or interdependence of the functions performed by these apparatuses, modules, or units.

It should be noted that the modifications of "one" and "plurality" mentioned in the present disclosure are indicative rather than restrictive, and those skilled in the art should understand that unless otherwise explicitly stated in the context, they should be understood as "at least one".

Messages or names of information interacted between a plurality of apparatuses in the implementations of the present disclosure are only for illustrative purposes and are not intended to limit the messages or the scope of the information.

It can be understood that before the use of the technical solutions disclosed in various embodiments of the present disclosure, users should be informed of the type, scope of use, usage scenarios, and the like of personal information involved in the present disclosure in accordance with relevant laws and regulations in an appropriate manner, so as to obtain authorization from the users.

For example, in response to receiving an active request of a user, prompt information is sent to the user to clearly remind the user that the personal information of the user needs to be involved in an operation requested to be executed. Thus, the user can independently select whether to provide the personal information to software or hardware such as an electronic device, an application program, a server, or a storage medium that performs the operation of the technical solutions of the present disclosure according to the prompt information.

As an alternative but non-restrictive implementation, in response to receiving an active request of a user, prompt information is sent to the user through, for example, a pop-up window where the prompt information can be presented in text. In addition, the pop-up window can also carry a selection control for the user to select whether to "agree" or "refuse" to provide the personal information to the electronic device.

It can be understood that the above notification and the above user authorization obtaining process are only illustrative and do not constitute a limitation on the implementations of the present disclosure. Other methods that meet the relevant laws and regulations can also be applied to the implementations of the present disclosure.

It can be understood that data involved in the technical solutions (including but not limited to the data itself, and obtaining or use of the data) should comply with the requirements of corresponding laws and regulations and relevant provisions.

FIG. 1 is a flowchart of an image processing method according to an embodiment of the present disclosure. This embodiment of the present disclosure is applicable to a situation for image fusion. The method can be performed by an image processing apparatus. The apparatus can be implemented in the form of software and/or hardware. Alternatively, the apparatus is implemented through an electronic device. The electronic device can be a mobile terminal, a personal computer (PC) end, a server, or the like.

As shown in FIG. 1, the method includes:

S110. A first face image and a second face image are obtained.

The first face image is an image corresponding to a face region in a first image, and the second face image is an image corresponding to a face region in a second image. The first face image may be an image obtained by cutting the face region of the first image. The second face image may be an image obtained by cutting the face region of the second image. Exemplarily, the first image may be understood as any image uploaded by a user and containing a face or as an image currently acquired in real time according to a triggering operation performed by a user. The second image may be understood as any other stylized image containing a face, which may be an image in different styles of other users, or various famous painting images containing facial features. The face region may be understood as a face region obtained by recognizing a face.

In this embodiment of the present disclosure, a client may respectively cut the face regions of the first image and the second image, to obtain the first face image and the second face image.

In this embodiment of the present disclosure, alternatively, the first face image and the second face image being obtained includes: when a triggering operation performed by a user is detected, the first image and a locally stored second image are obtained; face recognition is performed on the first image and the second image respectively; and the recognized face regions are cut from the first image and the second image respectively, to obtain the first face image and the second face image.

The triggering operation may be a triggering operation by a user. For example, the triggering operation may be: the user clicking on a button, the user clicking on or double clicking on the screen, recognizing a gesture or a blinking operation of the user, a voice control operation, or the like, which may be set according to an actual need. The triggering operation may be a detection control designed by a prop developer. The triggering operation of the user may be detected. The second image may be stored locally. The second image in this embodiment of the present disclosure may be an image of a famous painting locally stored in a prop package, or may be any other stylized image that contains a face. Exemplarily, in this embodiment of the present disclosure, when the triggering operation performed by the user is detected, a second image may be randomly selected from locally stored images.

In this embodiment of the present disclosure, when the triggering operation performed by the user is detected, the client obtains the first image and the locally stored second image; performs face recognition on the first image and the second image respectively; and cuts the recognized face regions from the first image and the second image respectively, to obtain the first face image and the second face image. In this embodiment of the present disclosure, through this setting, the first face image and the second face image can be quickly obtained by performing face recognition and cutting respectively on first image and the second image, thereby facilitating subsequent fusion processing. The cut face images can be sent to a server, which not only saves a bandwidth to an extent, but also reduces the data processing workload of the server.

S120. The first face image and the second face image are sent to a server for fusion processing.

The fusion processing may be understood as fusion processing on the first face image and the second face image. It may be completed by the server. In this embodiment of the present disclosure, the fusion processing may be: the cut first face image and the cut second face image are sent to the server, and the server may perform the fusion processing through a pre-trained image fusion model. In this embodiment, the first face image and the second face image are sent to the server for processing, which not only saves the computing resources of the client, but also utilizes the high computing capacity of the server to perform fusion processing on the first face image and the second face image, thereby obtaining a high-precision image.

In this embodiment of the present disclosure, the client sends the first face image and the second face image to the server for fusion processing In this embodiment of the present disclosure, alternatively, after the first face image and the second face image are sent to a server for fusion processing, the method further includes: a set face image is controlled to move towards the face region of the second image according to a set mode.

The set face image may be the first face image or a face image acquired in real time. The face image acquired in real time may be understood as a face image currently acquired by a camera in real time, which may be a face image of a user acquired by the camera. This embodiment of the present disclosure does not limit this. The set mode may be a mode preset by a developer.

Figure 2A:
FIG. 2*a* is a sample graph of a face region of a second image and a set face image in an image processing method according to an embodiment of the present disclosure.

Exemplarily, the facial feature of the second image and the set face image in this embodiment of the present disclosure are as shown in FIG. 2*a*. The oil painting in the background is the second image, and the user face image in the foreground is the first face image. The user face image is moved towards the face region in the oil painting according to the set mode.

In this embodiment of the present disclosure, after the first face image and the second face image are sent to a server for fusion processing, the set face image may be controlled to move towards the face region of the second image according to the set mode. In this embodiment of the present disclosure, through this setting, the set face image may be moved according to the set mode, so that the moving mode is more flexible and diversified.

In this embodiment of the present disclosure, alternatively, a set face image being controlled to move towards the face region of the second image according to a set mode includes: a playing animation of the set face image is obtained; and the set face image is displayed in the current picture according to the playing animation, thereby causing the set face image to move to the face region of the second image.

The playing animation may be a playing animation of the set face image. The playing animation may be understood as an animation of the moving mode of the set face image. The playing animation may be a preset animation, any animation, or set according to an actual need. Exemplarily, the playing animation may be set as an animation of moving to the left first and then moving diagonally upwards, or may be an animation in another moving mode. This embodiment of the present disclosure may display the set face image on the current picture according to the playing animation. In addition, the second image may be displayed according to a pre-designed playing animation too. In this embodiment, when the second image is displayed as a background in the current picture, the playing animation corresponding to the second image is to be obtained too. According to the playing animation corresponding to the second image, the second image is displayed as the background in the current picture. The playing animation may include motion information and display information of the set second image in a picture.

In this embodiment of the present disclosure, the client may obtain the playing animation of the set face image, and display the set face image in the current picture according to the playing animation, thereby causing the set screen image to move to the face region of the second image. In this embodiment of the present disclosure, through this setting, the set face image may be moved to the face region of the second image according to the playing animation. By the setting of the playing animation, the moving mode is made more diversified.

In this embodiment of the present disclosure, alternatively, the playing animation includes motion information and display information of the set face image in a picture. The set face image being displayed in the current picture according to the playing animation includes: the set face image is displayed in the current picture according to the motion information and the display information. The motion information includes position information and rotation information; and the display information includes size information and transparency information.

The playing animation may include motion information and display information of the set face image in a picture. Exemplarily, the motion information may include position information and rotation information. The position information may be understood as position information of each frame of the set face image in the current picture. The rotation information may be information such as a rotation direction and rotation angle of each frame of the set face image. The display information may include size information and transparency information. The size information may be understood as size information of scaling up or scaling down of each frame of the set face image. The transparency information may be understood as information of full transparency display or zero transparency display of each frame of the set face image. In this embodiment of the present disclosure, each frame of the set face image is moved according to the position information and the rotation information, and is displayed according to the size information and the transparency information.

Exemplarily, when the set face image is controlled to move to a set distance from the face region of the second image according to the set mode or to the face region of the second image, the set face image is displayed in full transparency. At the same time, subsequent Step S150 is executed.

In this implementation of the present disclosure, the client may display the set face image in the current picture according to the motion information and the display information. In this embodiment of the present disclosure, through this setting, the moving and display effect is made more diversified by setting the motion information and display information of each frame of the set face image.

In this embodiment of the present disclosure, alternatively, if the set face image is the face image acquired in real time, the set face image being displayed in the current picture according to the motion information and the display information includes: face segmentation is performed on an image acquired in real time to obtain the face image acquired in real time; pose transformation is performed on the face image acquired in real time according to set pose information; and the transformed face image is displayed in the current picture according to the motion information and the display information.

The image acquired in real time may be an image currently acquired in real time through a camera. The image acquired in real time may not be a front face image. For example, the acquired user image may not directly face the camera. The face segmentation may be understood as face recognition and segmentation on the image acquired in real time, or an operation of matting a face in the image acquired in real time. The face image acquired in real time may be obtained by performing the face segmentation on the image acquired in real time. The set pose information may be understood as standard pose information, which may be pose information facing a front surface of a screen. The set pose information may be set by a developer in advance and represented using matrix information. The pose transformation may be an operation of changing a pose of an image according to the set pose information.

In this embodiment of the present disclosure, when the set face image is the face image acquired in real time, the client may perform the face segmentation on the image acquired in real time to obtain the face image acquired in real time; perform pose transformation on the face image acquired in real time according to the set pose information; and then display the transformed face image in the current picture according to the motion information and display information.

In this embodiment of the present disclosure, the face image of the image acquired in real time can be transformed to a pose of directly facing the screen, so that the subsequent fusion processing can achieve a better display effect.

S130. The second image is displayed as a background in a current picture.

The second image may be understood as an original image corresponding to the second face image before cutting of the face region. Being displayed as a background may be understand as the second image being displayed as the background.

In this embodiment of the present disclosure, the client may display the second image as the background in the current picture.

S140. At least one fused face image returned by the server is received.

There may be one, two, or more fused face images. The fused face image may be an image obtained by fusing the first face image with the second face image, so that expression features of the original first face image can be maintained unchanged. Or, the fused face image may be a fused face image obtained by fusing the first face image with the second face image, and transforming an expression feature of the first face image. For example, the fused face image may be a fused face image obtained by fusing the first face image with the second face image, and transforming the expression feature of the first face image into a smiling expression. In this embodiment of the present disclosure, fusing face images may be performed by an image fusion model and an expression transformation model of the server.

In this embodiment of the present disclosure, the client receives the at least one fused face image returned by the server.

S150. The at least one fused face image is overlaid, according to the set order, to the face region of the second image for displaying, and a set object is displayed as a foreground in the current picture.

The set object is a target object corresponding to the first face image or a target object acquired in real time, and the target object acquired in real time corresponds to the target object corresponding to the first image. The target object acquired in real time corresponds to the target object corresponding to the first image, which may be understood as: the target object acquired in real time and the target object in the first image are the same or different target objects. For example, assuming that the target object is a person, the person acquired in real time may be the same person as the person in the first image or a person different from the person in the first image. The target object may be understood as an object obtained by matting a person corresponding to the first face image. Or, the target object may be an image acquired in real time by a user, and a person in the image acquired in real time needs to be matted to obtain the target object.

The set order may be an order set in advance, which may be set as needed. In this embodiment of the present disclosure, the at least one fused image may be overlaid, according to the set order, to the face region of the second image for displaying. In this embodiment of the present disclosure, the set object may be the image acquired in real time (e.g. an image currently acquired in real time by a user through a camera), and then a person image is matted to obtain the target object. For example, the current camera acquires an image of a current user making a funny face expression, and a person image in the image is cut to obtain the target object. Being displayed as a foreground may be understood as displaying in the foreground of the current picture according to a set position. The set position may be a position set in advance. Exemplarily, the image may be displayed at a lower right position of a center of the current picture. In this embodiment of the present disclosure, the current picture may be a picture that contains the fused face image and the set object.

Figure 2B:
FIG. 2*b* is a schematic diagram of the effect according to an embodiment of the present disclosure.

In this embodiment of the present disclosure, the client overlays, according to the set order, the at least one fused face image to the face region of the second image for displaying, and displays the target object corresponding to the first face image or the target object acquired in real time as the foreground in the current picture. Exemplarily, FIG. 2*b* is a schematic diagram of an effect in this embodiment. As shown in FIG. 2*b*, the fused face image is displayed in the face region of the second image in the background, and the person image acquired in real time is displayed in the foreground.

According to the technical solution of this embodiment of the present disclosure, a first face image and a second face image are obtained; the first face image and the second face image are sent to a server for fusion processing; the second image is displayed as a background in a current picture; at least one fused face image returned by the server is received; and the at least one fused face image is overlaid, according to a set order, to a face region of the second image for displaying, and a set object is displayed as a foreground in the current picture. The set object is a target object corresponding to the first face image or a target object acquired in real time. This technical solution can achieve fusion of face regions in two images, improving the diversity of image content, thereby enhancing the display effect.

Figure 3:
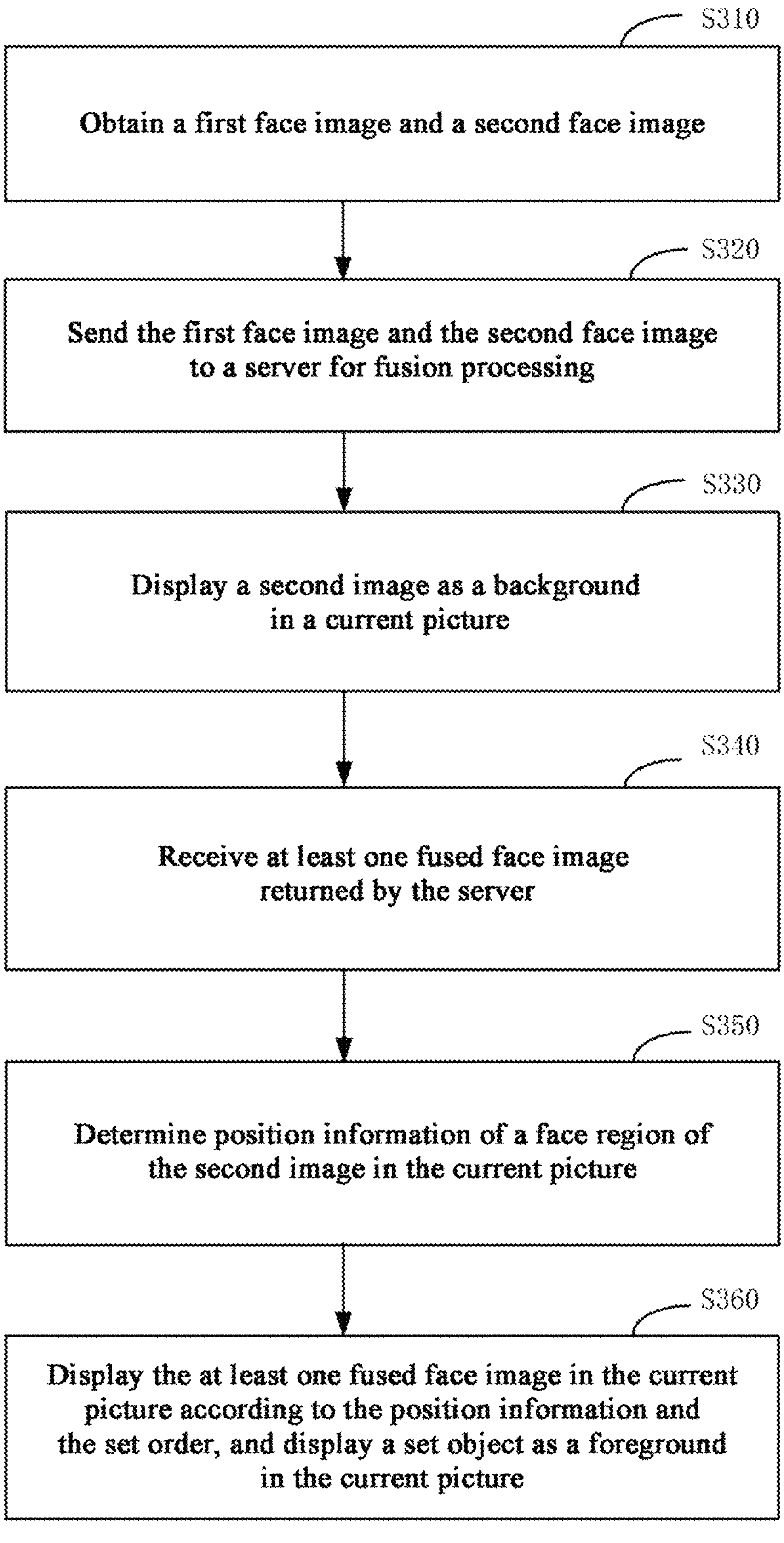
FIG. 3 is a flowchart of another image processing method according to an embodiment of the present disclosure.

FIG. 3 is a flowchart of an image processing method according to an embodiment of the present disclosure. This embodiment has been refined based on the alternative solutions provided in the above embodiment. Specifically, the at least one fused face image is overlaid, according to a set order, to the face region of the second image for displaying, which includes: the position information of the face region of the second image in the current picture is determined; and the at least one fused face image is displayed in the current picture according to the position information and the set order.

S310. A first face image and a second face image are obtained.

S320. The first face image and the second face image are sent to a server for fusion processing.

S330. A second image is displayed as a background in a current picture.

S340. At least one fused face image returned by the server is received.

S350. Position information of a face region of the second image in the current picture is determined.

The position information may be determined by a center point of the face region of the second image. Methods for determining the position information may be different because of different shapes of the second image. Exemplarily, when the second image is an elliptical image, the position information of the face region of the second image in the current image may be determined according to a center point of the ellipse. When the second image is a rectangular-box-shaped image, the position information of the face region of the second image in the current picture may be determined according to a center point of the rectangular box. The position information of the face region of the second image in the current picture may also be determined according to four vertexes of the rectangular box. This embodiment of the present disclosure does not limit this.

In this embodiment of the present disclosure, a client may determine the position information of the face region of the second image in the current picture.

S360. The at least one fused face image is displayed in the current picture according to the position information and the set order, and a set object is displayed as a foreground in the current picture.

The set object is a target object corresponding to the first face image or a target object acquired in real time.

In this embodiment of the present disclosure, the client may display the at least one fused face image in the current picture according to the determined position information and the set order, and display the set object as the foreground in the current picture. Exemplarily, in this implementation of the present disclosure, the at least one fused face image may be displayed in the current picture according to the position information and a preset order by aligning vertexes or center points. Correspondence and displaying are performed through the position information, making the display effect better.

According to the technical solution of this embodiment of the present disclosure, a first face image and a second face image are obtained; the first face image and the second face image are sent to a server for fusion processing; a second image is displayed as a background in the current picture; at least one fused face image returned by the server is received; position information of a face region of the second image in the current picture is determined; the at least one fused face image is displayed in the current picture according to the position information and a set order, and a set object is displayed as a foreground in the current picture. The set object is a target object corresponding to the first face image or a target object acquired in real time. This technical solution can achieve fusion of face regions in two images, improving the diversity of image content, thereby enhancing the display effect.

In this embodiment of the present disclosure, alternatively, the at least one fused face image includes a fused face image of a first expression and a fused face image of a second expression. The at least one fused face image is overlaid, according to a set order, to the face region of the second image for displaying, which includes: the fused face image of the first expression is first overlaid to the face region of the second image for displaying for a set duration, and the fused face image of the second expression is then overlaid to the face region of the second image for displaying; or, the fused face image of the second expression is first overlaid to the face region of the second image for displaying for a set duration, and then the fused face image of the first expression is then overlaid to the face region of the second image for displaying.

The at least one fused face image may include the fused face image of the first expression and the fused face image of the second expression. The fused face image of the first expression may be understood as a fused face image that is obtained by fusing the first face image with the second face image and maintains an original face expression feature of the first face image. The fused face image of the second expression may be understood as a fused face image obtained by performing expression transformation on the face expression of the first face image. Exemplarily, the fused face image of the second expression may be a fused face image with a smiling expression, which is obtained by fusing the first face image with the second face image and processing the face expression of the first face image into the smiling expression. The set duration is a display duration of the fused face image. Exemplarily, the set duration may be 2 seconds, 3 seconds, or the like, which may be set according to an actual need.

In this embodiment of the present disclosure, the fused face image of the first expression may be first overlaid to the face region of the second image for displaying for the set duration, and the fused face image of the second expression may be then overlaid to the face region of the second image for displaying. Alternatively, the fused face image of the second expression may be first overlaid to the face region of the second image for displaying for the set duration, and the fused face image of the first expression may be then overlaid to the face region of the second image for displaying. The display order of the fused face image of the first expression and the fused face image of the second expression is not limited in this embodiment of the present disclosure. Exemplarily, in this embodiment of the present disclosure, the fused face image of the first expression may be first overlaid to the face region of the second image for displaying for 2 seconds, and the fused face image of the second expression may be then overlaid to the face region of the second image for displaying. Or, the fused face image of the second expression may be first overlaid to the face region of the second image for displaying for 2 seconds, and the fused face image of the first expression may be then overlaid to the face region of the second image for displaying.

In this embodiment of the present disclosure, through this setting, different display orders can be flexibly set for the fused face image of the first expression and the fused face image of the second expression, which not only improves the diversity of expressions in image content, but also diversifies the display effect.

In this embodiment of the present disclosure, alternatively, the at least one fused face image is overlaid to the face region of the second image according to a set order for displaying, which includes: a target object image is obtained, wherein the target object image is an image obtained by segmenting the target object from a reference face image; the target object image and the at least one fused face image are input to a set image processing model, and at least one fused face image that contains the target object is output; and the at least one fused face image that contains the target object is overlaid, according to the set order, to the face region of the second image for displaying.

The target object image may be an image obtained by segmenting the target object from the reference face image. Exemplarily, the reference face image may be a face image with glasses or a face image with headwear, and the target object may be understood as the glasses, the headwear, or the like. The headwear may be a hat, a hair band, or another headwear feature. The target object image may be an image obtained by segmenting the glasses or the headwear from the face image with the glasses or the face image with the headwear. The reference face image may be understood as any image that contains the target object. In this embodiment of the present disclosure, the target object image may be obtained by segmenting the target object from the reference face image.

The image processing model may be a pre-trained image model. In this embodiment of the present disclosure, the target object image and the at least one fused face image may be input to the set image processing model, and the at least one fused face image that contains the target object may be output.

In this embodiment of the present disclosure, the client may segment the target object from the reference face image to obtain the target object image. The target object image and the at least one fused face image are input to the set image processing model, and the at least one fused face image that contains the target object may be output. The at least one fused face image that contains the target object is overlaid, according to the set order, to the face region of the second image for displaying.

In this embodiment of the present disclosure, the target object image may be obtained by segmenting any reference image, and the fused face image may be processed to obtain the fused face image that contains the target object, so that the image content of the fused face image is made more diverse, and the user experience is made better.

In this embodiment of the present disclosure, alternatively, the at least one fused face image is overlaid to the face region of the second image according to a set order for displaying, which includes: texture information of the second image is obtained; the at least one fused face image is processed according to the texture information; and the at least one fused face image after processing is overlaid, according to the set order, to the face region of the second image for displaying.

The texture information may be texture information of the second image. The texture information may be obtained through a body region or another region of the second image. Exemplarily, in this embodiment of the present disclosure, the texture information may be extracted by placing the second image into a texture extraction model. The texture information may be data or matrix data. In this embodiment of the present disclosure, the obtained texture information may be multiplied by the fused face image to obtain the at least one fused face image after processing.

In this embodiment of the present disclosure, the client may extract the texture information by placing the second image into the texture extraction model, to obtain the texture information of the second image, and may process the least one fused face image according to the texture information and then overlay, according to the preset order, the at least one fused face image after processing to the face region of the second image for displaying.

In this embodiment of the present disclosure, the fused image is processed by obtaining the texture information of the second image, thereby avoiding causing the fused image to be obtrusive and achieving a more realistic display effect on the fused image.

Figure 4:
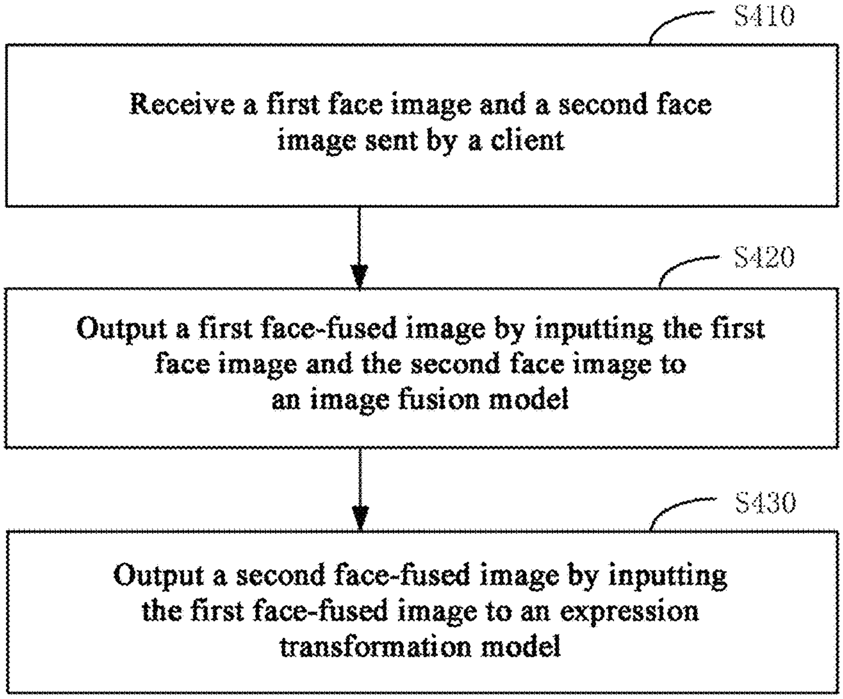
FIG. 4 is a flowchart of still another image processing method according to an embodiment of the present disclosure.

FIG. 4 is a flowchart of an image processing method according to an embodiment of the present disclosure. This embodiment of the present disclosure is applicable to a situation for image fusion. The method may be performed by an image processing apparatus. The apparatus may be implemented in the form of software and/or hardware. Alternatively, the apparatus is implemented through an electronic device. The electronic device may be a mobile terminal, a PC end, a server, or the like.

S410. A first face image and a second face image sent by a client are received.

This embodiment of the present disclosure may be executed by a server. In this embodiment of the present disclosure, the server may receive the first face image and the second face image which are sent by the client.

S420. A first face-fused image is output by inputting the first face image and the second face image to an image fusion model.

The image fusion model may be a pre-trained model for fusing images. The first face-fused image may be obtained by inputting the first face image and the second face image to the image fusion model for fusion processing. In this embodiment of the present disclosure, the first face image and the second face image may be input to the image fusion model, to output the first face-fused image (i.e. a fused face image of a first expression).

S430. A second face-fused image is output by inputting the first face-fused image to an expression transformation model.

The expression transformation model may be a pre-trained model that performs expression transformation on images. The expression may be transformed into a smiling expression or another expression, which may be set according to an actual need. The second face-fused image may be obtained by inputting the first face-fused image to the expression transformation model for expression transformation. In this implementation of the present disclosure, the server may input the first face-fused image to the expression transformation model to output the second face-fused image (i.e. the fused face image of the second expression).

According to the technical solution of this embodiment of the present disclosure, the first face image and the second face image which are sent by the client are received; the first face image and the second face image are input to the image fusion model, thereby the first face-fused image is output; and the first face-fused image is input to the expression transformation model, thereby the second face-fused image is output. According to this technical solution, face regions in two images can be fused through the image fusion model, and a fused image can be subjected to expression transformation through the expression transformation model, thereby improving the diversity of image content and enhancing the display effect.

In this embodiment of the present disclosure, alternatively, the image fusion model includes a first encoder, a second encoder, and a decoder. The first face image and the second face image are input to an image fusion model, and a first face-fused image is output, which includes: The first face image is input to the first encoder, thereby a facial feature is output; the second face image is input to the second encoder, thereby a structural feature is output; and the facial feature and the structural feature are input to the decoder, thereby the first face-fused image is output.

The encoder may be used to extract features from an input image. The decoder is used to decode the features. Facial feature (identity document, ID) information may be represented by a vector with a set size, such as a vector of 1*512. Structural feature information may include texture information, expression information, structural information, and pose information of a person image, as well as multi-scale feature information. In this embodiment of the present disclosure, the first encoder may process the first face image and extract the facial feature. The second encoder may process the second face image and extract the structural feature. The first face-fused image may be obtained by inputting the facial feature and the structural feature to the decoder.

In this embodiment of the present disclosure, the server may input the first face image to the first encoder and output the facial feature represented by the vector with the size of 1*512; input the second face image to the second encoder and output the structural feature information including the texture information, the expression information, the structural information, and the pose information of a characters; and input the facial feature and the structural feature to the decoder and output the first face-fused image.

In this embodiment of the present disclosure, through this setting, the facial feature and the structural feature are input to the decoder for processing, so that the obtained face-fused image can be made closer to the facial feature of the original image and be more realistic, thereby effectively enhancing the display effect.

Figure 5:
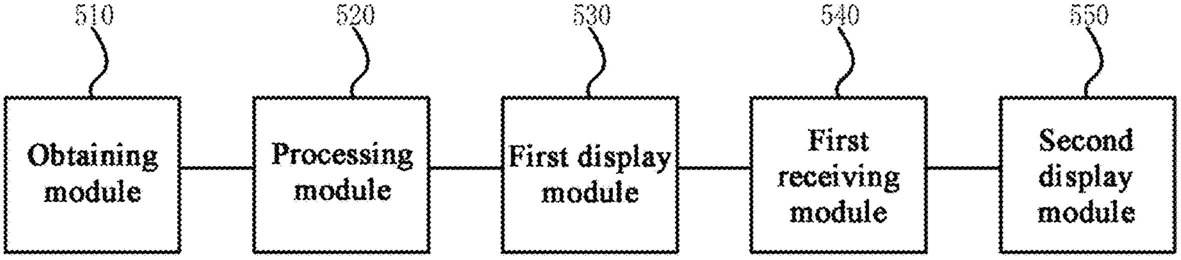
FIG. 5 is a schematic structural diagram of an image processing apparatus according to an embodiment of the present disclosure.

FIG. 5 is a schematic structural diagram of an image processing apparatus according to an embodiment of the present disclosure. As shown in FIG. 5, the apparatus includes: an obtaining module 510, a processing module 520, a first display 530, a first receiving module 540, and a display module 550.

The obtaining module 510 is configured to obtain a first face image and a second face image. The first face image is an image corresponding to a face region in a first image, and the second face image is an image corresponding to a face region in a second image.

The processing module 520 is configured to send the first face image and the second face image to a server for fusion processing.

The first display module 530 is configured to display the second image as a background in a current picture.

The first receiving module 540 is configured to receive at least one fused face image returned by the server.

The second display module 550 is configured to: overlay, according to a set order, the at least one fused face image to the face region of the second image for displaying, and display a set object as a foreground in the current picture. The set object is a target object corresponding to the first face image or a target object acquired in real time, and the target object acquired in real time corresponds to the target object corresponding to the first image.

Alternatively, the obtaining module 510 is configured to:
- when detecting a triggering operation performed by a user, obtain the first image and a locally stored second image;
- respectively perform face recognition on the first image and the second image; and
- respectively cut the recognized face regions from the first image and the second image, to obtain the first face image and the second face image.

Alternatively, the apparatus further includes: a moving module, configured to: after sending the first face image and the second face image to a server for fusion processing, control a set face image to move towards the face region of the second image according to a set mode. The set face image is the first face image or a face image acquired in real time.

Alternatively, the first display module 530 includes:
- a playing animation obtaining unit, configured to obtain a playing animation of the set face image; and
- an image display and moving unit, configured to display the set face image in the current picture according to the playing animation, to cause the set face image to move to the face region of the second image.

Alternatively, the playing animation includes motion information and display information of the set face image in a picture; and the image display and moving unit is configured to:
- display the set face image in the current picture according to the motion information and the display information. The motion information includes position information and rotation information; and the display information includes size information and transparency information.

Alternatively, if the set face image is the face image acquired in real time, the image display and moving unit is configured to:
- perform face segmentation on an image acquired in real time to obtain the face image acquired in real time;
- perform pose transformation on the face image acquired in real time according to set pose information; and
- display the transformed face image in the current picture according to the motion information and the display information.

Alternatively, the second display module 550 is configured to:
- determine position information of the face region of the second image in the current picture; and
- display the at least one fused face image in the current picture according to the position information and the set order.

Alternatively, the fused face image includes a fused face image of a first expression and a fused face image of a second expression, and the second display module 550 is configured to:

first overlay the fused face image of the first expression to the face region of the second image for displaying for a set duration, and then overlay the fused face image of the second expression to the face region of the second image for displaying; or, first overlay the fused face image of the second expression to the face region of the second image for displaying for a set duration, and then overlay the fused face image of the first expression to the face region of the second image for displaying.

Alternatively, the second display module 550 is configured to:

obtain a target object image, wherein the target object image is an image obtained by segmenting the target object from a reference face image;

input the target object image and the at least one fused face image to a set image processing model, to output at least one fused face image that contains the target object; and overlay, according to the set order, the at least one fused face image that contains the target object to the face region of the second image for displaying.

Alternatively, the second display module 550 is configured to:

obtain texture information of the second image;

process the at least one fused face image according to the texture information; and overlay, according to the set order, the at least one fused face image after processing to the face region of the second image for displaying.

The image processing apparatus provided according to this embodiment of the present disclosure can implement the image processing method provided in any embodiment of the present disclosure, and includes corresponding functional modules for implementing the method.

It is worth noting that the various units and modules included in the above apparatus are only divided according to a functional logic, but are not limited to the above division, as long as the corresponding functions can be achieved. In addition, the specific names of the various functional units are only for the purpose of distinguishing and are not used to limit the protection scope of the embodiments of the present disclosure.

Figure 6:
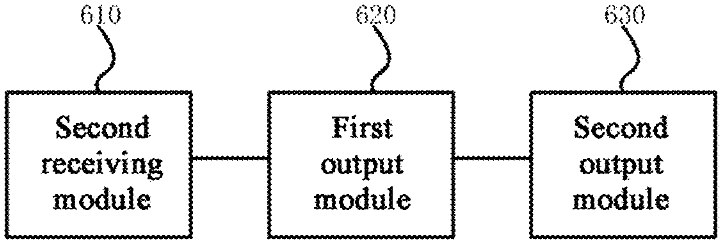
FIG. 6 is a schematic structural diagram of another image processing apparatus according to an embodiment of the present disclosure.

FIG. 6 is a schematic structural diagram of an image processing apparatus according to an embodiment of the present disclosure. As shown in FIG. 6, the apparatus includes: a second receiving module 610, a first output module 620, and a second output module 630.

The second receiving module 610 is configured to receive a first face image and a second face image sent by a client.

The first output module 620 is configured to: outputting a first face-fused image by inputting the first face image and the second face image to an image fusion model.

The second output module 630 is configured to: outputting a second face-fused image by inputting the first face-fused image to an expression transformation model.

Alternatively, the image fusion module includes a first encoder, a second encoder, and a decoder; and the first output module 620 is configured to:

output a facial feature by inputting the first face image to the first encoder;

output a structural feature by inputting the second face image to the second encoder; and output the first face-fused image by inputting the facial feature and the structural feature to the decoder.

The image processing apparatus provided according to this embodiment of the present disclosure can implement the image processing method provided in any embodiment of the present disclosure, and includes corresponding functional modules for implementing the method.

It is worth noting that the various units and modules included in the above apparatus are only divided according to a functional logic, but are not limited to the above division, as long as the corresponding functions can be achieved. In addition, the specific names of the various functional units are only for the purpose of distinguishing and are not used to limit the protection scope of the embodiments of the present disclosure.

Figure 7:
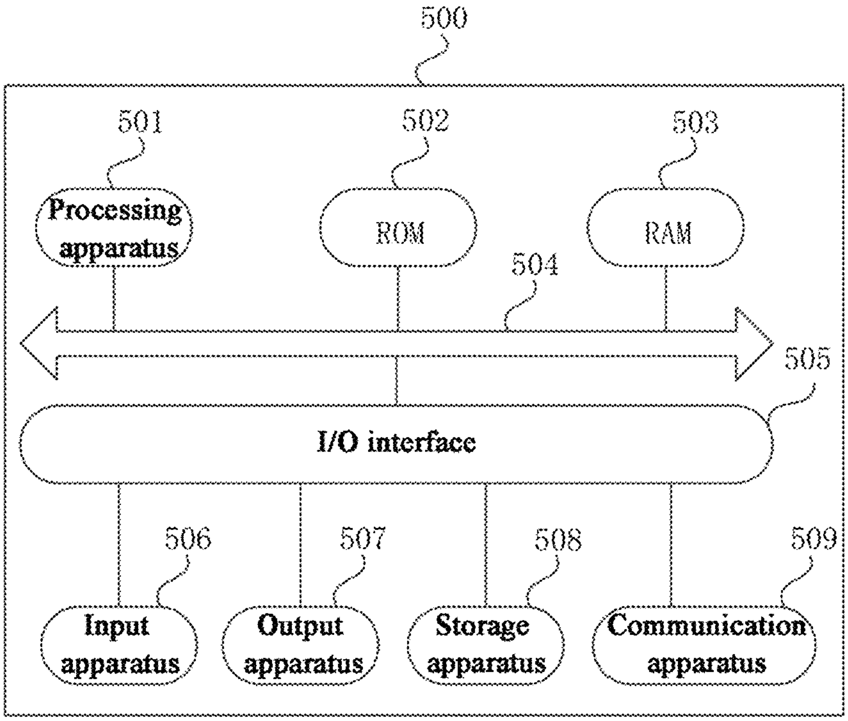
FIG. 7 is a schematic structural diagram of an electronic device according to the embodiments of the present disclosure.

FIG. 7 is a schematic structural diagram of an electronic device according to the embodiments of the present disclosure. Reference is now made to FIG. 7 below, which illustrates a schematic structural diagram of an electronic device (namely, a terminal device or a server in FIG. 7) 500 suitable for implementing an embodiment of the present disclosure. The terminal device in this embodiment of the present disclosure may include but is not limited to a mobile terminal such as a mobile phone, a laptop, a digital broadcast receiver, a Personal Digital Assistant (PDA), a PAD, a Portable Media Player (PMP), an in-vehicle terminal (such as an in-vehicle navigation terminal), and a fixed terminal such as digital television (TV) and a desktop computer. The electronic device shown in FIG. 7 is only an example and should not impose any limitations on the functionality and scope of use of the embodiments of the present disclosure.

As shown in FIG. 7, the electronic device 500 may include a processing apparatus (such as a central processing unit and graphics processor) 501 that can perform various appropriate actions and processing according to programs stored in a Read-Only Memory (ROM) 502 or loaded from a storage apparatus 508 to a Random Access Memory (RAM) 503. Various programs and data required for operations of the electronic device 500 may also be stored in the RAM 503. The processing apparatus 501, the ROM 502, and the RAM 503 are connected to each other through a bus 504. An Input/Output (I/O) interface 505 is also connected to the bus 504.

Usually, following apparatuses can be connected to the I/O interface 505: an input apparatus 506 including a touch screen, a touchpad, a keyboard, a mouse, a camera, a microphone, an accelerometer, a gyroscope, and the like; an output apparatus 507 including a Liquid Crystal Display (LCD), a speaker, a vibrator, and the like; a memory 508 including a magnetic tape, a hard disk, and the like; and a communication apparatus 509. The communication apparatus 509 can allow the electronic device 500 to wirelessly or wiredly communicate with other devices to exchange data. Although FIG. 7 shows the electronic device 500 with multiple apparatuses, it should be understood that the electronic device 500 is not required to implement or have all the apparatuses shown, and can alternatively implement or have more or fewer apparatuses.

Particularly, according to the embodiments of the present disclosure, the process described in the reference flowchart above can be implemented as a computer software program. For example, the embodiments of the present disclosure include a computer program product, including a computer program carried on a non-transitory computer-readable medium, and the computer program includes program codes used for performing the methods shown in the flowcharts. In such an embodiment, the computer program may be downloaded and installed from a network through the communication apparatus 509, or installed from the memory 508, or installed from the ROM 502. When the computer program is executed by the processing apparatus 501, the above-mentioned functions defined in the methods of the embodiments of the present disclosure are executed.

Messages or names of information interacted between a plurality of apparatuses in the implementations of the present disclosure are only for illustrative purposes and are not intended to limit the messages or the scope of the information.

The electronic device provided in this embodiment of the present disclosure and the image processing method provided in the above embodiment belong to the same concept. Technical details not fully described in this embodiment can be found in the above embodiments.

The embodiments of the present disclosure provide a computer storage medium storing thereon a computer program. The program, when executed by a processor, implements the image processing method provided in the above embodiments.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage media may include, but are not limited to: an electrical connection with one or more wires, a portable computer disk, a hard disk, a RAM, a ROM, an Erasable Programmable Read Only Memory (EPROM or flash memory), an optical fiber, Compact Disc Read Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including but not limited to: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but not limited to: a wire, an optical cable, a Radio Frequency (RF), and the like, or any suitable combination of the above.

In some implementations, clients and servers can communicate using any currently known or future-developed network protocol such as a HyperText Transfer Protocol (HTTP), and can intercommunicate and be interconnected with digital data in any form or medium (for example, a communication network). Examples of the communication network include a Local Area Network (LAN), a Wide Area Network (WAN), an internet (such as an Internet), a point-to-point network (such as an ad hoc point-to-point network, and any currently known or future developed network.

The computer-readable medium may be included in the electronic device or exist alone and is not assembled into the electronic device.

The above computer-readable medium carries at least one program. The at least one program, when executed by the electronic device, causes the electronic device to:

obtain a first face image and a second face image, wherein the first face image is an image corresponding to a face region in a first image, and the second face image is an image corresponding to a face region in a second image; sending the first face image and the second face image to a server for fusion processing; displaying the second image as a background in a current picture; receiving at least one fused face image returned by the server; and overlaying, according to a set order, the at least one fused face image to a face region of the second image for displaying, and displaying a set object as a foreground in the current picture, wherein the set object is a target object corresponding to the first image or a target object acquired in real time, and the target object acquired in real time corresponds to the target object corresponding to the first image.

Alternatively, the above computer-readable storage medium carries at least one program. The above at least one program, when executed by the electronic device, causes the electronic device to: receive a first face image and a second face image which are sent by a client; output a first face-fused image by inputting the first face image and the second face image to an image fusion model, and output a first face-fused image; and outputting a second face-fused image by inputting the first face-fused image to an expression transformation model, and outputting a second face-fused image.

Computer program codes for performing the operations of the present disclosure may be written in one or more programming languages or a combination thereof. The above programming languages include but are not limited to an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and computer instructions.

The units described in the embodiments of the present disclosure can be implemented through software or hardware. The name of the unit does not constitute a limitation on the unit itself. For example, the first obtaining unit can also be described as "a unit that obtains at least two Internet protocol addresses".

The functions described herein above may be performed, at least in part, by one or a plurality of hardware logic components. For example, nonrestrictively, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable medium may include an electrical connection based on one or more wires, a portable computer disk, a hard disk, a RAM, a ROM, an EPROM or flash memory, an optical fiber, a CD-ROM, an optical storage device, a magnetic storage device, or any suitable combinations of the above contents.

According to at least one embodiment of the present disclosure, an image processing method is provided, including:

- obtaining a first face image and a second face image, where the first face image is an image corresponding to a face region in a first image, and the second face image is an image corresponding to a face region in a second image;
- sending the first face image and the second face image to a server for fusion processing;
- displaying the second image as a background in a current picture;
- receiving at least one fused face image returned by the server; and
- overlaying, according to a set order, the at least one fused face image to the face region of the second image for displaying, and displaying a set object as a foreground in the current picture, where the set object is a target object corresponding to the first image or a target object acquired in real time, and the target object acquired in real time corresponds to the target object corresponding to the first image.

Alternatively, obtaining the first face image and the second face image includes:

- in response to detecting a triggering operation performed by a user, obtaining the first image and a locally stored second image;
- respectively performing face recognition on the first image and the second image; and
- respectively cutting recognized face regions from the first image and the second image, to obtain the first face image and the second face image.

Alternatively, after sending the first face image and the second face image to the server for fusion processing, the method further includes:

- controlling a set face image to move towards the face region of the second image according to a set mode, where the set face image is the first face image or a face image acquired in real time.

Alternatively, the controlling a set face image to move towards the face region of the second image according to a set mode includes:

- obtaining a playing animation of the set face image; and
- displaying the set face image in the current picture according to the playing animation, causing the set face image to move to the face region of the second image.

Alternatively, the playing animation includes motion information and display information of the set face image in a picture; and displaying the set face image in the current picture according to the playing animation includes:

- displaying the set face image in the current picture according to the motion information and the display information, where the motion information includes position information and rotation information; and the display information includes size information and transparency information.

Alternatively, if the set face image the set face image is the face image acquired in real time, displaying the set face image in the current picture according to the motion information and the display information includes:

- performing face segmentation on an image acquired in real time to obtain the face image acquired in real time;
- performing pose transformation on the face image acquired in real time according to set pose information; and
- displaying the transformed face image in the current picture according to the motion information and the display information.

Alternatively, overlaying, according to the set order, the at least one fused face image to the face region of the second image for displaying includes:

- determining position information of the face region of the second image in the current picture; and
- displaying the at least one fused face image in the current picture according to the position information and the set order.

Alternatively, the at least one fused face image includes a fused face image of a first expression and a fused face image of a second expression; and overlaying, according to the set order, the at least one fused face image to the face region of the second image for displaying includes:

- first overlaying the fused face image of the first expression to the face region of the second image for displaying for a set duration, and
- then overlaying the fused face image of the second expression to the face region of the second image for displaying; or,
- first overlaying the fused face image of the second expression to the face region of the second image for displaying for a set duration; and
- then overlaying the fused face image of the first expression to the face region of the second image for displaying.

Alternatively, overlaying, according to the set order, the at least one fused face image to the face region of the second image for displaying includes:

obtaining a target object image, where the target object image is an image obtained by segmenting the target object from a reference face image;

inputting the target object image and the at least one fused face image to a set image processing model, to output at least one fused face image that contains the target object; and overlaying, according to the set order, the at least one fused face image that contains the target object to the face region of the second image for displaying.

Alternatively, overlaying, according to the set order, the at least one fused face image to the face region of the second image for displaying includes:

obtaining texture information of the second image;

processing the at least one fused face image according to the texture information; and overlaying, according to the set order, the at least one fused face image after processing to the face region of the second image for displaying.

According to at least one embodiment of the present disclosure, an image processing method is provided, including:

receiving a first face image and a second face image sent by a client;

outputting a first face-fused image by inputting the first face image and the second face image to an image fusion model; and outputting a second face-fused image by inputting the first face-fused image to an expression transformation model.

Alternatively, the image fusion model includes a first encoder, a second encoder, and a decoder; and outputting the first face-fused image by inputting the first face image and the second face image to the image fusion model includes:

outputting a facial feature by inputting the first face image to the first encoder;

outputting a structural feature by inputting the second face image to the second encoder; and outputting the first face-fused image by inputting the facial feature and the structural feature to the decoder.

The above description is only for explaining the alternative embodiments of the present disclosure and technical principles used in the embodiments. Those skilled in the art should understand that the scope of disclosure referred to in the present disclosure is not limited to the technical solutions formed by specific combinations of the aforementioned technical features, but also covers other technical solutions formed by any combinations of the aforementioned technical features or their equivalent features without departing from the concept of the above disclosure, for example, a technical solution formed by replacing the above features with (but not limited to) technical features with similar functions disclosed in the present disclosure.

In addition, although various operations are depicted in a specific order, this should not be understood as requiring these operations to be executed in the specific order shown or in a sequential order. In certain environments, multitasking and parallel processing may be advantageous. Similarly, although several specific implementation details are included in the above discussion, these should not be interpreted as limiting the scope of the present disclosure. Some features described in the context of individual embodiments can also be combined and implemented in a single embodiment. On the contrary, various features that are described in the context of the single embodiment may also be implemented in a plurality of embodiments separately or in any suitable sub-combinations.

Although the subject matter has been described in a language specific to structural features and/or method logical actions, it should be understood that the subject matter limited in the attached claims may not necessarily be limited to the specific features or actions described above. On the contrary, the specific features and actions described above are only exemplary forms for implementing the claims.

I claim:

1. An image processing method, comprising:

obtaining a first face image and a second face image, wherein the first face image is an image corresponding to a face region in a first image, and the second face image is an image corresponding to a face region in a second image;

sending the first face image and the second face image to a server for fusion processing;

displaying the second image as a background in a current picture;

receiving at least one fused face image returned by the server; and overlaying, according to a set order, the at least one fused face image to the face region of the second image for displaying, and displaying a set object as a foreground in the current picture, wherein the set object is a target object corresponding to the first face image or a target object acquired in real time, and the target object acquired in real time corresponds to the target object corresponding to the first image.

2. The method according to claim 1, wherein obtaining the first face image and the second face image comprises:

in response to detecting a triggering operation performed by a user, obtaining the first image and a locally stored second image;

respectively performing face recognition on the first image and the second image; and respectively cutting recognized face regions from the first image and the second image, to obtain the first face image and the second face image.

3. The method according to claim 1, wherein after sending the first face image and the second face image to the server for fusion processing, the method further comprises:

controlling a set face image to move towards the face region of the second image according to a set mode, wherein the set face image is the first face image or a face image acquired in real time.

4. The method according to claim 3, wherein controlling the set face image to move towards the face region of the second image according to the set mode comprises:

obtaining a playing animation of the set face image; and displaying the set face image in the current picture according to the playing animation, to cause the set face image to move to the face region of the second image.

5. The method according to claim 4, wherein the playing animation comprises motion information and display information of the set face image in a picture; and displaying the set face image in the current picture according to the playing animation comprises:

displaying the set face image in the current picture according to the motion information and the display information, wherein the motion information comprises position information and rotation information; and the display information comprises size information and transparency information.

6. The method according to claim 5, wherein in response to the set face image being the face image acquired in real time, displaying the set face image in the current picture according to the motion information and the display information comprises:

performing face segmentation on an image acquired in real time to obtain the face image acquired in real time;

performing pose transformation on the face image acquired in real time according to set pose information; and displaying the transformed face image in the current picture according to the motion information and the display information.

7. The method according to claim 1, wherein overlaying, according to the set order, the at least one fused face image to the face region of the second image for displaying comprises:

determining position information of the face region of the second image in the current picture; and displaying the at least one fused face image in the current picture according to the position information and the set order.

8. The method according to claim 1, wherein the at least one fused face image comprises a fused face image of a first expression and a fused face image of a second expression;

and overlaying, according to the set order, the at least one fused face image to the face region of the second image for displaying comprises:

first overlaying the fused face image of the first expression to the face region of the second image for displaying for a set duration, and then overlaying the fused face image of the second expression to the face region of the second image for displaying; or, first overlaying the fused face image of the second expression to the face region of the second image for displaying for a set duration; and then overlaying the fused face image of the first expression to the face region of the second image for displaying.

9. The method according to claim 1, wherein overlaying, according to the set order, the at least one fused face image to the face region of the second image for displaying comprises:

obtaining a target object image, wherein the target object image is an image obtained by segmenting the target object from a reference face image;

inputting the target object image and the at least one fused face image to a set image processing model, to output at least one fused face image that contains the target object; and overlaying, according to the set order, the at least one fused face image that contains the target object to the face region of the second image for displaying.

10. The method according to claim 1, wherein overlaying, according to the set order, the at least one fused face image to the face region of the second image for displaying comprises:

obtaining texture information of the second image;

processing the at least one fused face image according to the texture information; and overlaying, according to the set order, the at least one fused face image after processing to the face region of the second image for displaying.

11. An image processing method, comprising:

receiving a first face image and a second face image sent by a client;

outputting a first face-fused image by inputting the first face image and the second face image to an image fusion model; and outputting a second face-fused image by inputting the first face-fused image to an expression transformation model.

12. The method according to claim 11, wherein the image fusion model comprises a first encoder, a second encoder, and a decoder; and outputting the first face-fused image by inputting the first face image and the second face image to the image fusion model comprises:

outputting a facial feature by inputting the first face image to the first encoder;

outputting a structural feature by inputting the second face image to the second encoder; and outputting the first face-fused image by inputting the facial feature and the structural feature to the decoder.

13. An electronic device, comprising:

at least one processor; and a storage apparatus, configured to storage at least one program, wherein the at least one program, when executed by the at least one processor, causes the at least one processor obtain a first face image and a second face image, wherein the first face image is an image corresponding to a face region in a first image, and the second face image is an image corresponding to a face region in a second image;

send the first face image and the second face image to a server for fusion processing;

display the second image as a background in a current picture;

receive at least one fused face image returned by the server; and overlay, according to a set order, the at least one fused face image to the face region of the second image for displaying, and display a set object as a foreground in the current picture, wherein the set object is a target object corresponding to the first face image or a target object acquired in real time, and the target object acquired in real time corresponds to the target object corresponding to the first image.

14. The electronic device according to claim 13, wherein the at least one program, when causing the at least one processor to obtain the first face image and the second face image, causes the at least one processor to:

in response to detecting a triggering operation performed by a user, obtain the first image and a locally stored second image;

respectively perform face recognition on the first image and the second image; and respectively cut recognized face regions from the first image and the second image, to obtain the first face image and the second face image.

15. The electronic device according to claim 13, wherein the at least one program, when executed by the at least one processor, causes the at least one processor to, after sending the first face image and the second face image to the server for fusion processing:

control a set face image to move towards the face region of the second image according to a set mode, wherein the set face image is the first face image or a face image acquired in real time.

16. The electronic device according to claim 15, wherein the at least one program, when causing the at least one processor to control the set face image to move towards the face region of the second image according to the set mode, causes the at least one processor to:

obtain a playing animation of the set face image; and display the set face image in the current picture according to the playing animation, to cause the set face image to move to the face region of the second image.

17. The electronic device according to claim 16, wherein the playing animation comprises motion information and display information of the set face image in a picture; and the at least one program, when causing the at least one processor to display the set face image in the current picture according to the playing animation, causes the at least one processor to:

display the set face image in the current picture according to the motion information and the display information, wherein the motion information comprises position information and rotation information; and the display information comprises size information and transparency information.

18. The electronic device according to claim 17, wherein the at least one program, when causing the at least one processor to in response to the set face image being the face image acquired in real time, display the set face image in the current picture according to the motion information and the display information, causes the at least one processor to:

perform face segmentation on an image acquired in real time to obtain the face image acquired in real time;

perform pose transformation on the face image acquired in real time according to set pose information; and display the transformed face image in the current picture according to the motion information and the display information.

19. The electronic device according to claim 13, wherein the at least one program, when causing the at least one processor to overlay, according to the set order, the at least one fused face image to the face region of the second image for displaying, causes the at least one processor to:

determine position information of the face region of the second image in the current picture; and display the at least one fused face image in the current picture according to the position information and the set order.

20. The electronic device according to claim 13, wherein the at least one fused face image comprises a fused face image of a first expression and a fused face image of a second expression; and the at least one program, when causing the at least one processor to overlay, according to the set order, the at least one fused face image to the face region of the second image for displaying, causes the at least one processor to:

first overlay the fused face image of the first expression to the face region of the second image for displaying for a set duration, and then overlay the fused face image of the second expression to the face region of the second image for displaying; or, first overlay the fused face image of the second expression to the face region of the second image for displaying for a set duration; and then overlay the fused face image of the first expression to the face region of the second image for displaying.

* * * * *